(12) United States Patent
Gersten

(10) Patent No.: US 6,928,193 B2
(45) Date of Patent: Aug. 9, 2005

(54) FUNDUS IMAGING

(76) Inventor: Martin Gersten, 420 E. 51$^{st}$ St., New York, NY (US) 10022

(*) Notice: Subject to any disclaimer, the term of this patent is extended or adjusted under 35 U.S.C. 154(b) by 707 days.

(21) Appl. No.: 10/010,432

(22) Filed: Dec. 5, 2001

(65) Prior Publication Data

US 2003/0103660 A1 Jun. 5, 2003

(51) Int. Cl.$^7$ .............................................. G06K 9/40
(52) U.S. Cl. .................................................. 382/275
(58) Field of Search ........................... 382/115, 117, 382/118, 128, 254, 255, 260, 275, 280; 351/210, 206; 708/404; 702/77; 342/196; 324/76.21; 250/339.08, 363.07; 700/110; 600/162, 166

(56) References Cited

U.S. PATENT DOCUMENTS

| | | | |
|---|---|---|---|
| 4,102,563 A | 7/1978 | Matsumura | 351/207 |
| 5,193,124 A * | 3/1993 | Subbarao | 382/255 |
| 5,661,816 A * | 8/1997 | Fantone et al. | 382/100 |
| 5,737,456 A | 4/1998 | Carrington | 382/299 |
| 5,835,265 A | 11/1998 | Mammone | 359/383 |
| 5,841,911 A | 11/1998 | Kopeika | 382/254 |
| 6,053,865 A | 4/2000 | Sugiyama | 600/300 |
| 6,154,574 A | 11/2000 | Paik | 382/255 |
| 6,511,180 B2 * | 1/2003 | Guirao et al. | 351/211 |
| 2003/0001098 A1 * | 1/2003 | Stoddart et al. | 250/363.04 |

* cited by examiner

Primary Examiner—Andrew W. Johns
Assistant Examiner—Shervin Nakhjavan
(74) Attorney, Agent, or Firm—Howard R. Poppeir

(57) ABSTRACT

Degradations of the image acquired by a fundus camera, including those due to intraocular defects are reduced by digitizing the image, taking an FFT of row and column image data, correlating the FFTs of the rows and of the columns to obtain resultant row product vectors and column vectors. The Nth root of the resultant row and column product vectors is computed, where N is the respective numbers of rows and columns. A minimum offset term is subtracted from each element of the resultant vector to obtain the PSF spatial spectrum (MTF) of the eye. Each row FFT and each column FFT is then divided by the MTF after which the inverse FFT yields a restored distortion-reduced image.

7 Claims, 1 Drawing Sheet

FUNDUS IMAGING

FIELD OF THE INVENTION

This invention relates to digital signal processing and, more particularly, to processing images of the retina to obtain accurate information.

BACKGROUND OF THE INVENTION

While the ophthalmoscope is useful in detecting early signs of diabetes, cardiovascular disease and other related conditions, obtaining a wide view of the interior of the eye and the periphery of the retina with this instrument generally requires that the iris be dilated. A more convenient tool for patient screening is provided by the non-mydriatic fundus camera which can be used as a diagnostic tool by ophthalmologists, optometrists and other medical professionals. Information is sought, for example, about the condition of the retina's dendritic pattern of blood vessels, the macula and the optic nerve among the main features of the fundus. The non-mydriatic camera attempts to focus a ring of light through the pupil to illuminate the retina without the need for dilation of the pupil. The ring of light diverges as it exits the posterior crystalline lens of the eye so that a large, defocused spot is formed on the retina. The return optical path between the fundus and the camera again traverses the crystalline lens The retinal image is acquired by the camera through the central hole in the ring of light.

Unfortunately, the retinal image obtained this way contains several major types of distortion. Some of these, such as distortion due to the camera and its optical system can be compensated by calibration with a standard test image. Others, arising in inaccessible portions of the optical path, such as intraocular reflections, haze in the vitreous humor, haze and flare due to a cataractous lens diffusing the peripheral ring of light into the central 'viewing hole', or corneal inhomogeneities, have not yielded to available image processing methods. In addition to the foregoing, and despite the use of strobed flash, images may be blurred as a result of axial movement of the patient's head, high velocity, micro-saccadic eye movements, or the operator's inability simultaneously to achieve all of the conditions necessary for a sharp image. Thus, the very eyes which require the highest level of diagnostic image quality (those exhibiting intraocular pathology) are the ones most likely to suffer from one or more of the foregoing image degradation problems. Accordingly, images obtained heretofore by conventional fundus cameras have suffered from an indeterminate amount of distortion and artifactual noise. It would be of inestimable value to be able to remove such distortions from the image acquired by a fundus camera.

SUMMARY OF THE INVENTION

We have discovered that, the degradation of the retinal image acquired by a fundus camera may be considered to be the point spread function (PSF) of the optical path, including the media of the eye itself (cornea, aqueous humor, crystalline lens, aqueous humor, intraocular membranes, etc.) together with image acquisition apparatus (principally the fundus camera). In accordance with the principles of the invention, for processing purposes, this point spread function is deemed to be constant from point to point throughout the image, or at least through particular segments thereof. However, the point-to-point amplitude of the retinal image, which consists largely of dendritic networks of blood vessels, varies from point-to-point in a quasi-random manner. The detected (distorted) image, therefor, consists of the randomly varying ideal image convolved with the relatively constant PSF which affects every part of the image in substantially the same way. The retina, sampled for example in straight lines, such as rows and columns, yields a "random" video signal due to the dendritic fractal nature of the retina's anatomy. Any amplitude vector in the image, no matter in which direction the image is sliced, e.g., whether vertically or horizontally, will contain the PSF convolved with the retinal image data. Simple inspection of any vector will reveal nothing but random variations in amplitude because the convolved PSF has the effect only of blurring and adding haze to the ideal "random" image features.

However, if the image is converted from a conventional 'space-domain' representation to a 'frequency-domain' representation, then the spatial-spectrum of the PSF (the modulation-transfer-function or MTF) of the image may easily be separated from the spatial-spectra of the ideal image data, as elucidated below. As is well known (Castleman, et al), a convolution in the space-domain is equivalent to a vector multiplication in the frequency domain. In accordance with the invention, the image is first divided into rows and columns and each row is converted from a space representation to a frequency representation through the application of a Fast Fourier Transform. Each transformed vector is stored in computer memory. Each of these vectors contains the spectrum of the row's image data multiplied by the spectrum of the PSF (MTF). If each transformed vector is correlated with every other transformed vector in the image, the random variation produced by the "ideal" signal will eventually be swamped by the steady value of the MTF. The value of the MTF (or its transform, the PSF), however, is what we are looking for and what we need to obtain the ideal image from the image obtained by the fundus camera. When all of the rows have thus been correlated to form a resultant vector, the Nth root of the resultant vector is computed where N is the number of rows that have been multiplied. The resultant vector now contains the mean MTF of the optical system. Each element of this mean MTF vector is offset by a more or less constant DC term. This term is the product of all of the random amplitudes of the ideal image data of each column. We have found, in practice, that the minimum value in the result vector may now be located and subtracted from all of the elements of the result vector to yield the correct MTF values. However, in some special cases, coefficients may be applied to the offset data to yield a more accurate estimate of the MTF. Dividing each FFT-transformed row by the MTF and obtaining the inverse FFT of the rows yields the horizontally restored ideal image. The procedure may then be repeated by similarly correlating all of the column vectors to yield the vertically restored ideal image.

BRIEF DESCRIPTION OF THE DRAWING

The foregoing objects and features of the invention may become more apparent from the ensuing written description when read together with the drawing in which.

DETAILED DESCRIPTION

Figure 1:
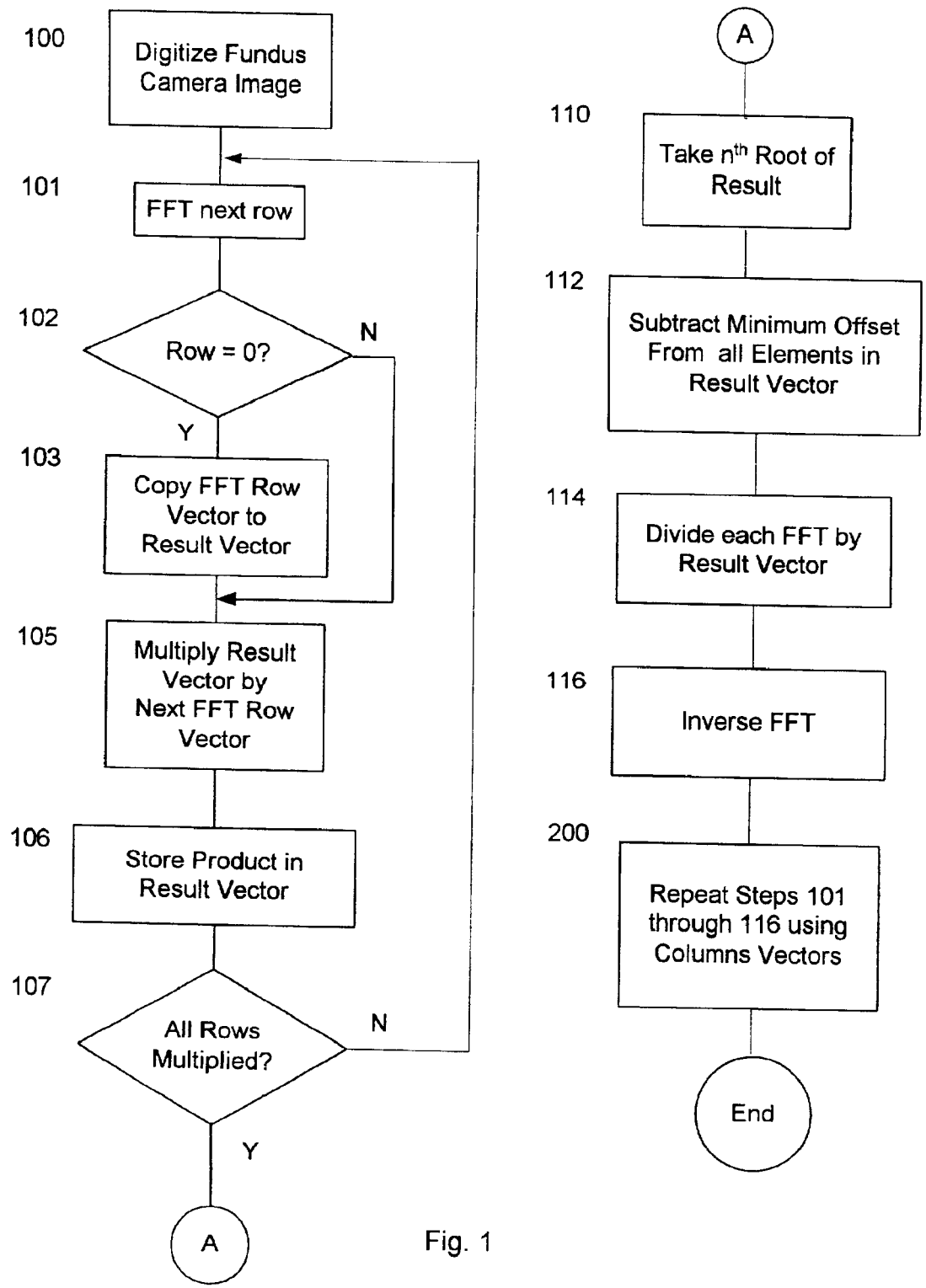
FIG. 1 is a flow chart of the process of the invention.

Before referring to FIG. 1, an overall review of the process of the invention may be helpful. Let I represent the object of interest, e.g., the retina of the human eye. Let E represent the point spread function (PSF) of the media of the eye and let the PSF of a camera such as a fundus camera (not shown) and imaging optics be represented by C. Then the actual image A reported by the camera is the retinal object (I) degraded by being convolved with E and C. In the frequency domain, a convolution is a simple vector multiplication. Therefore, a fast Fourier transform (FFT) taken of the actual image A is the product of the FFTs of I, E and C. If, for the moment, we accept that the PSF of a high quality fundus camera makes a negligible contribution to the image then the FFT of A can be assumed to be the product of the FFTs of I and E. So, to improve A, we must divide its Fourier transform by the Fourier transform of E. In the simplest case, E should remain constant throughout the media of the eye. Let us scan and digitize the image obtained by the fundus camera. For example, let the image be scanned by rows and columns. In our acquired discrete digital image therefore, E has been convolved with every line and row of the image A. Now, let us consider the retinal object, I, which contains blood vessels and nerves arranged in 2-dimensional dendritic fractal-like pseudo-random structures. Therefore: 1-dimensional column/row samples of I are essentially random waveforms. But, of course, the random waveforms are all convolved with E. So, if we correlate all of the rows, we will get a result row vector which is the constant E sitting on top of a "DC" offset which represents all of the randomness of the ideal image, I. We do the same for the columns of the image and measure its DC offset and subtract it, leaving the PSF of the EYE itself. Then we divide each row and column of A by E and we do an inverse FFT and obtain a corrected and clear image.

Referring now to FIG. 1, at step 100 the image acquired by the fundus camera is digitized. At step 101 an FFT is taken of the "next" row of the digitized image data. The first time the process is executed the "next" row is, of course, the first row. At step 102 a determination is made whether the last row of the digitized data has been FFT'd. At step 103, if the last row had been reached in step 102, the row vector of FFT data is copied to the FFT result vector. In step 105 the result vector is multiplied by the next FFT row vector. This is the correlation step discussed above. In step 107 a determination is made whether all of the FFT row vectors have been correlated. The process continues with step 110 which computes the Nth root of the FFT result vector, where N is the number of rows. In step 112 a minimum offset is subtracted from all elements of the FFT result vector. In step 114 each FFT row vector is divided by the FFT result vector. In step 116 the inverse FFT is taken and in step 200 the foregoing procedure is repeated for each column of the acquired image data. The inverse FFT produces a corrected image.

What has been described is deemed to be illustrative of the principles of the invention. It will be apparent, for example, to those skilled in the art that the method of the present invention may be applied to restore images acquired in other ways (e.g., ultrasound, CT scans, snapshots, satellite photos, etc.) so long as the image does not contain appreciable amounts of periodic data. Transforms other than the FFT may advantageously be used. For example, the Z-Transform may in general be used to take discrete signal amplitudes (such as those obtained by sampling an image of the retina taken by a fundus camera) into a complex-variable domain where it plays a similar role to the one that the Laplace Transform does in the continuous time domain. Like the Laplace transform, the Z-transform offers a different way solving problems and designing discrete domain applications. It will also be apparent that the scanning or sampling of the image may be done radially from any desired center of interest, such as the center of sight, the fovea, the macula, etc., and that non-linear scans may also be employed so that more samples are taken at areas of interest. It may also be useful, prior to the application of the restoration method described above, to re-sample images at a higher resolution than the original and then low-pass filter the result. Subjecting the images to such "anti-aliasing", prior to computing the MTF, may produce a result that is useful in some applications. Further and other modifications will be apparent to those skilled in the art and may be made without, however, departing from the spirit and scope of the invention.

What is claimed is:

1. Removing from a retinal image acquired by a fundus camera, image degradations arising from intraocular defects, comprising the steps of:
   a.) digitizing said acquired image;
   b.) taking an FFT of said digitized image by rows and columns;
   c.) correlating said FFTs to obtain resultant row product vectors and column vectors;
   d.) finding the root equal to the respective numbers of rows and columns of the resultant row and column product vectors to obtain quotients;
   e.) subtracting from each of said quotients a minimum offset term to obtain the PSF spatial spectrum (MTF) of the eye;
   f.) dividing each row FFT and each column FFT by said MTF; and
   g.) taking the inverse FFT to yield a restored distortion-reduced image.

2. The method of removing from an acquired image degradations arising from optical defects in inaccessible portions of the optical path, comprising the steps of
   a.) digitizing said acquired image;
   b.) scanning said acquired image along predetermined paths to obtain vectors of data;
   c.) taking a discrete transform of said vectors of data;
   d.) correlating said discrete transform of said vectors to obtain resultant product vectors;
   e.) finding roots of the resultant product vectors for each of said predetermined paths;
   f.) subtracting from each of said roots a minimum offset term to obtain a point spread function spatial spectrum (MTF);
   g.) dividing each discrete transform of said vectors by said MTF; and
   h.) taking the inverse discrete transform to yield a restored distortion-reduced image.

3. The method of claim 2 wherein said acquired image is a retinal image acquired by a fundus camera.

4. The method of claim 3 wherein at least one of said predetermined paths traverses a predetermined feature of said retinal image.

5. The method of claim 3 wherein said discrete transform is a fast Fourier transform.

6. The method of claim 4 wherein said predetermined paths are row and column paths of said image.

7. The method of claim 5 wherein there are N of said predetermined paths and said root is the Nth root of said product vectors.

* * * * *